United States Patent
Tsai et al.

(10) Patent No.: US 11,445,538 B2
(45) Date of Patent: Sep. 13, 2022

(54) CHANNEL ACCESS PROCEDURE FOR UL TRANSMISSION

(71) Applicant: MEDIATEK INC., Hsinchu (TW)

(72) Inventors: Cheng-Rung Tsai, Hsinchu (TW); Chiou-Wei Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 6 days.

(21) Appl. No.: 16/749,763

(22) Filed: Jan. 22, 2020

(65) Prior Publication Data

US 2020/0245353 A1  Jul. 30, 2020

Related U.S. Application Data

(60) Provisional application No. 62/796,207, filed on Jan. 24, 2019.

(51) Int. Cl.
*H04W 74/08* (2009.01)
*H04W 72/14* (2009.01)
*H04W 72/12* (2009.01)
*H04W 72/04* (2009.01)
*H04L 1/18* (2006.01)
*H04L 5/00* (2006.01)

(52) U.S. Cl.
CPC ........... *H04W 72/14* (2013.01); *H04L 1/1819* (2013.01); *H04L 5/0055* (2013.01); *H04W 72/042* (2013.01); *H04W 72/0446* (2013.01); *H04W 72/0453* (2013.01); *H04W 72/1268* (2013.01)

(58) Field of Classification Search
CPC ... H04L 1/1819; H04L 5/0055; H04L 1/1671; H04L 5/0096
See application file for complete search history.

(56) References Cited

U.S. PATENT DOCUMENTS

| 2017/0289869 A1* | 10/2017 | Nogami ............... H04W 36/06 |
| 2019/0037601 A1* | 1/2019 | Noh ................. H04L 27/0006 |
| 2019/0246412 A1* | 8/2019 | Noh ..................... H04W 84/12 |

(Continued)

FOREIGN PATENT DOCUMENTS

| CN | 109196809 | 1/2019 |
| WO | 2013142221 | 9/2013 |
| WO | 2018062976 | 4/2018 |

OTHER PUBLICATIONS

"3rd Generation Partnership Project; Technical Specification Group Radio Access Network; Physical Layer Procedures for Shared Spectrum Channel Access", (Release 15), 3GPP TS 37.213 V15.1.0; Technical Specification, Sep. 2018, pp. 1-20 (Year: 2018).*

(Continued)

*Primary Examiner* — Lan-Huong Truong
(74) *Attorney, Agent, or Firm* — Oblon, McClelland, Maier & Neustadt, L.L.P.

(57) ABSTRACT

Aspects of the disclosure further provide an apparatus and a method for wireless communication. The apparatus includes processing circuitry that receives, from a base station (BS), a downlink (DL) grant scheduling an uplink (UL) transmission to the BS. The DL grant indicates a first type of channel access procedure for the UL transmission. The processing circuitry performs a channel access procedure for the UL transmission according to the first type of channel access procedure indicated by the DL grant.

20 Claims, 4 Drawing Sheets

(56) References Cited

U.S. PATENT DOCUMENTS

2019/0342915 A1* 11/2019 Kim .................. H04W 72/0446

OTHER PUBLICATIONS

Combined Taiwanese Office Action and Search Report dated Dec. 24, 2020 in corresponding Taiwanese Patent Application No. 109102599 (with English Translation of Category of Cited Documents), 11 pages.
"3rd Generation Partnership Project; Technical Specification Group Radio Access Network; Physical Layer Procedures for Shared Spectrum Channel Access", (Release 15), 3GPP TS 37.213 V15.1.0; Technical Specification, Sep. 2018, pp. 1-20.
International Search Report and Written Opinion dated Apr. 22, 2020 in International Application No. PCT/CN2020/073954. (9 pages).
Huawei et al., "Design principles of physical channels on NR unlicensed band," R1-1803676, 3GPP TSG RAN WG1 Meeting #92: Sanya, China, Apr. 16-20, 2018 (3 pages).

* cited by examiner

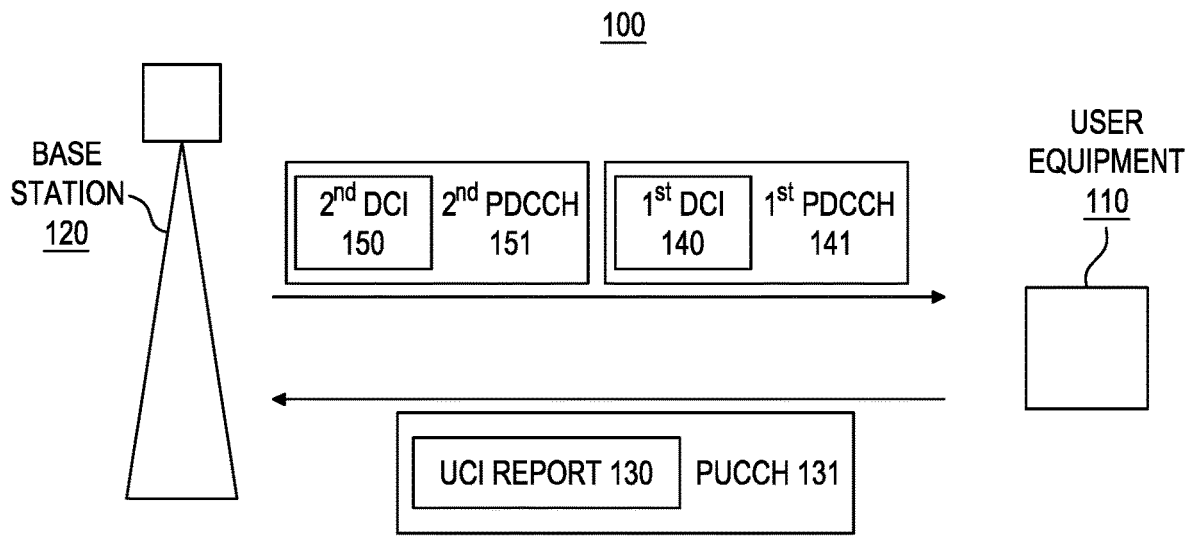

FIG. 1

| Bit field mapped to index | Channel Access Type | CP extension |
|---|---|---|
| 0 | Type2C-ULChannelAccess | 0 |
| 1 | Type2C-ULChannelAccess | C2*symbol length -16 us - TA |
| 2 | Type2B-ULChannelAccess | 0 |
| 3 | Type2B-ULChannelAccess | C2*symbol length -16 us - TA |
| 4 | Type2A-ULChannelAccess | 0 |
| 5 | Type2A-ULChannelAccess | 1*symbol length - 25 us |
| 6 | Type2A-ULChannelAccess | C3*symbol length - 25 us - TA |
| 7 | Type1-ULChannelAccess | 0 |
| 8 | Type1-ULChannelAccess | 1*symbol length - 25 us |
| 9 | Type1-ULChannelAccess | C2*symbol length - 16 us - TA |
| 10 | Type1-ULChannelAccess | C3*symbol length - 25 us - TA |

| Bit field mapped to index | Channel Access Type | CP extension |
|---|---|---|
| 0 | Type2C-ULChannelAccess | C2*symbol length – 16 us – TA |
| 1 | Type2A-ULChannelAccess | C3*symbol length – 25 us – TA |
| 2 | Type2A-ULChannelAccess | C1*symbol length – 25 us |
| 3 | Type1-ULChannelAccess | 0 |

…

CHANNEL ACCESS PROCEDURE FOR UL TRANSMISSION

INCORPORATION BY REFERENCE

This present disclosure claims the benefit of U.S. Provisional Application No. 62/796,207, "CHANNEL ACCESS PROCEDURE FOR UCI REPORTING" filed on Jan. 24, 2019, which is incorporated herein by reference in its entirety.

TECHNICAL FIELD

The present disclosure relates to wireless communications, and specifically relates to channel access procedure for an uplink transmission.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Channel access on unlicensed spectrum is regulated in every country (e.g., a radio's transmission power). For example, Europe and Japan have the requirement that Listen-Before-Talk (LBT) is performed in channel access. Europe and Japan also have regulations on the maximum duration of a radio's transmission after one LBT. Even in the U.S., which does not have either the LBT requirement or the maximum transmission duration requirement, considerations on license assisted access (LAA)'s coexistence with WiFi have led to a LAA design that enforces LBT and limits maximum duration. LBT and the limit on maximum transmission duration led to prolonged discussions on channel access and they have also heavily impacted LAA's design.

SUMMARY

Aspects of the disclosure provide a method for wireless communication. Under the method, user equipment (UE) can receive from a base station (BS) a downlink (DL) grant scheduling an uplink (UL) transmission to the BS. The DL grant indicates a first type of channel access procedure for the UL transmission. The UE can perform a channel access procedure for the UL transmission according to the first type of channel access procedure indicated by the DL grant.

According to aspects of the disclosure, a channel occupancy information for a channel occupancy that is initiated by the BS can be received from the BS. The UE can determine whether the UL transmission is scheduled within the channel occupancy that is initiated by the BS, and perform a second type of channel access procedure when the UL transmission is determined to be scheduled within the channel occupancy that is initiated by the BS.

In an embodiment, the channel occupancy information is carried by downlink control information (DCI).

According to aspects of the disclosure, the channel occupancy information indicates a duration in time domain and a location in frequency domain for the channel occupancy that is initiated by the BS. The UE can determine whether the UL transmission is scheduled within the duration in time domain and the location in frequency domain for the channel occupancy that is initiated by the BS. When the UL transmission is determined to be scheduled within the duration in time domain and the location in frequency domain for the channel occupancy that is initiated by the BS, the UE can perform the second type of channel access procedure.

In an embodiment, the first type of channel access procedure and the second type of channel access procedure are the same.

According to aspects of the disclosure, the DL grant schedules a DL reception and indicates a timing offset between the DL reception and the UL transmission.

In an embodiment, the UL transmission includes hybrid automatic repeat request-acknowledge (HARQ-ACK) information for the DL reception.

Aspects of the disclosure further provide an apparatus for wireless communication. The apparatus includes processing circuitry that receives, from a base station (BS), a downlink (DL) grant scheduling an uplink (UL) transmission to the BS. The DL grant indicates a first type of channel access procedure for the UL transmission. The processing circuitry performs a channel access procedure for the UL transmission according to the first type of channel access procedure indicated by the DL grant.

Aspects of the disclosure further provide a non-transitory computer-readable medium which stores instructions implementing any one of a combination of the methods for wireless communication.

BRIEF DESCRIPTION OF THE DRAWINGS

Various embodiments of this disclosure that are proposed as examples will be described in detail with reference to the following figures, wherein like numerals reference like elements, and wherein:

FIG. 1 shows an exemplary wireless system according to an embodiment of the disclosure;

FIG. 2 shows a table tabulating exemplary combinations for the non-fallback downlink assignments according to an embodiment of the disclosure;

DETAILED DESCRIPTION OF EMBODIMENTS

Figures 3, 4:
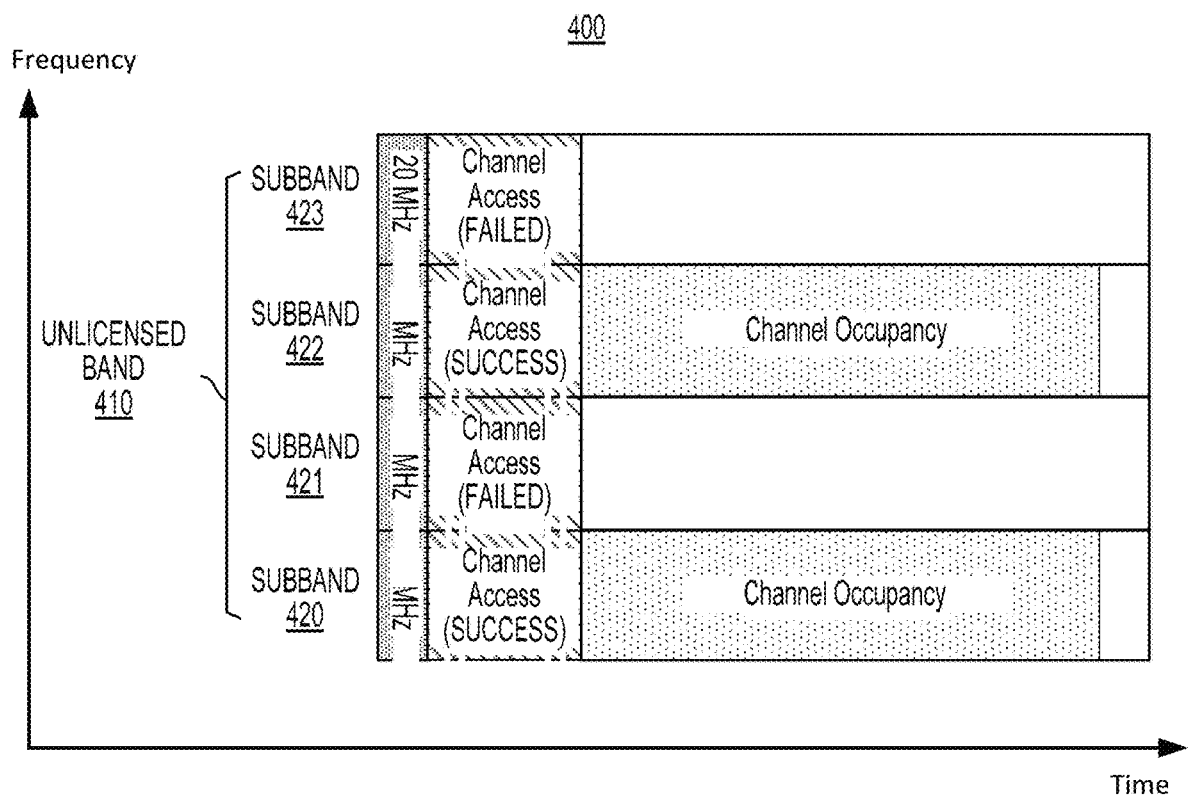
FIG. 3 shows a table tabulating exemplary combinations for the fallback downlink assignments according to an embodiment of the disclosure.
FIG. 4 shows an exemplary channel access procedure operating on an unlicensed band 410 according to an embodiment of the disclosure.

FIG. 1 shows a wireless communication system 100 according to some embodiments of the disclosure. The wireless communication system 100 can include a user equipment (UE) 110 and a base station (BS) 120. In some examples, the system 100 employs the fifth-generation (5G) New Radio (NR) air interface developed by the 3rd Generation Partnership Project (3GPP). In some examples, the system 100 employs other wireless communication technologies developed by various standard development organizations. In some examples, the system 100 employs non-standardized wireless communication technologies.

In some examples, the BS 120 can be a base station implementing an eNB node as specified in LTE or a gNB node as specified in the 5G NR air interface standards developed by 3GPP. In one example, the BS 120 can be configured to control one or more antenna arrays to form directional Tx or Rx beams for transmitting or receiving wireless signals. The UE 110 can be a mobile phone, a laptop computer, a vehicle carried mobile communication device, a utility meter fixed at a certain location, and the like. Similarly, the UE 110 can employ one or more antenna arrays to generate directional Tx or Rx beams for transmitting or receiving wireless signals in one example. Depending on the air interface between the BS 120 and the UE 110, the BS 120 and the UE 110 can communicate with each other according to respective communication protocols.

In various embodiments, the UE 110 can perform uplink (UL) transmissions to the BS 120. In FIG. 1 example, the UE 110 transmits an uplink control information (UCI) report 130 to the BS 120. The UCI report 130 can include a hybrid automatic repeat request acknowledgement (HARQ-ACK) for a received downlink (DL) assignment, channel state information (CSI) related to DL channel conditions used for a DL scheduling, and a scheduling request (SR) indicating the UE 110 needs uplink (UL) resources for UL transmissions.

In various embodiments, the UL transmissions can be transmitted over one or more UL resources, such as physical uplink control channel (PUCCH) resources that are scheduled by the BS 120. In FIG. 1 example, the UCI report 130 is transmitted over one PUCCH resource 131. In other examples, the UCI report 130 can be transmitted over multiple PUCCH resources. When the PUCCH resource 131 is scheduled on an unlicensed band, the BS 120 may perform a channel access procedure to initiate a channel occupancy in the unlicensed band. After the channel access procedure, the BS 120 can determine channel occupancy information for the channel occupancy initiated by the BS 120. In one example, the channel occupancy information can include a duration in time domain and a location in frequency domain for the channel occupancy initiated by the BS 120. Then the BS 120 can transmit the channel occupancy information to the UE 110, for example, through a group common physical downlink control channel (PDCCH) (e.g., $1^{st}$ PDCCH 141), which may carry downlink control information (DCI) with format 2_0 (e.g., $1^{st}$ DCI 140). Based on the received channel occupancy information, the UE 110 can determine whether the PUCCH resource 131 is located within the channel occupancy initiated by the BS 120.

In some embodiments, the PUCCH resources can be a number of physical resource blocks (PRBs) over an orthogonal frequency division multiplex (OFDM) resource grid.

According to aspects of the disclosure, the UE 110 also can perform a channel access procedure on an unlicensed channel over which the UE 110 plans to perform the UL transmissions. In FIG. 1 example, when the UE 110 does not receive any channel occupancy information from the BS 120, the UE 110 may sense the unlicensed channel according to a type of channel access procedure indicated in a DL grant that is sent from the BS 120 and schedules the PUCCH 131. The DL grant can be a PDCCH (e.g., $2^{nd}$ PDCCH 151) including DCI with format 1_0 or 1_1 (e.g., $2^{nd}$ DCI 150). Accordingly, based on an outcome of the channel access procedure on the unlicensed channel, the UE 110 can perform the UL transmissions over one or more PUCCH resources whose channel access procedure are successful.

In some embodiments, when the UE 110 receives the channel occupancy information of the BS 120, the UE may determine another type of channel access procedure that is different from the type of channel access procedure indicated in the DL grant (e.g., $2^{nd}$ PDCCH 151), based on the channel occupancy information and the type of channel access procedure indicated in the DL grant. For example, if an UL resource is scheduled within a channel occupancy initiated by the BS 120, the UE 110 performs a type of channel access procedure indicated by the DL grant. However, if the UL resource is scheduled outside of the channel occupancy, the UE 110 performs a predefined type of channel access procedure. In another example, if an UL resource is scheduled within a channel occupancy initiated by the BS 120, the UE 110 performs a predefined type of channel access procedure that is different from the one indicated by the DL grant. However, if the UL resource is scheduled outside of the channel occupancy, the UE 110 performs the type of channel access procedure indicated in the DL grant.

In the channel access procedure, the UE 110 or the BS 120 can sense the channel, for example, by using Listen-Before-Talk (LBT) techniques, and evaluate the availability of the channel for the UL transmissions. A basic unit of the sensing procedure is a sensing slot with a duration $T_{sl}$ (e.g., $T_{sl}$=9 μs). The sensing slot duration $T_{sl}$ is considered to be idle, when the UE 110 or the BS 120 senses the channel during the sensing slot duration and determines that a detected power for a duration (e.g., 4 μs) within the sensing slot duration is less than an energy detection threshold $X_{Thresh}$. Otherwise, the sensing slot duration $T_{sl}$ is considered to be busy.

The channel access procedure includes Type 1 and Type 2 channel access procedures. The Type 1 channel access procedures include a plurality of sub-types with different priorities. The Type 2 channel access procedures include a plurality of sub-types with different sensing intervals, such as Type 2A, Type 2B, and Type 2C channel access procedures.

For Type 1 channel access procedure (Cat. 4 LBT), the UE 110 may perform the UL transmission after first sensing the channel to be idle during the slot durations of a defer duration $T_d$, and after the counter N is zero in step 4. The counter N is adjusted by sensing the channel for additional slot duration(s) according to the steps described below.

1) set N=$N_{init}$, where $N_{init}$ is a random number uniformly distributed between 0 and $CW_p$, and go to step 4;
2) if N>0 and the UE 110 chooses to decrement the counter, set N=N−1;
3) sense the channel for an additional slot duration, and if the additional slot duration is idle, go to step 4; else, go to step 5;
4) if N=0, stop; else, go to step 2;
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5.

For Type 2A channel access procedure (Cat. 2 LBT), the UE 110 may perform the UL transmissions immediately after sensing the channel to be idle for at least a sensing interval $T_{short\_ul}$ (e.g., $T_{short\_ul}$=25 μs).

For Type 2B channel access procedure (Cat. 2 LBT), the UE 110 may perform the UL transmissions immediately after sensing the channel to be idle within a duration of $T_f$ (e.g., $T_f$=16 μs).

For Type 2C channel access procedure (Cat. 1 LBT), the UE 110 may perform the UL transmissions without sensing the channel.

As described above, a specific type of channel access procedure can be indicated in the DL grant. Specifically, the type of channel access procedure can be indicated in a DCI field (e.g., $2^{nd}$ DCI 150). When the UE 110 performs the UL transmissions on an unlicensed band, the UE 110 may determine a respective type of channel access procedure for each UL resource within the unlicensed band. In addition, the DCI field can also indicate a UL resource cannot be used for the UL transmissions. For example, the DCI field may use 00, 01, 10, and 11 to indicate Cat. 1 LBT, Cat. 2 LBT, Cat. 4 LBT, and no report, respectively. In some cases, the DCI field only indicates the type of channel access procedure.

According to aspects of the disclosure, for non-fallback DL assignments (format 1_1) scheduling UL transmissions (e.g. PUCCH), an LBT type and a length of a cyclic prefix (CP) extension can be jointly encoded in the DL assignment. The combinations of the LBT type and the length of the CP extension that can be dynamically signaled are RRC configured for the UE 110 with a UE-specific RRC signaling. The DCI field can have up to 4 bits, depending on how many combinations the RRC signaling indicates for the UE.

FIG. 2 shows a table 200 tabulating exemplary combinations for the non-fallback DL assignments according to an embodiment of the disclosure. The RRC configuration supports indication of all combinations of the rows except:

(1) a combination of "C2*symbol length—16 us-TA" and "Cat2 25 µs";
(2) a combination of "C3*symbol length—25 us-TA" and "Cat1 16 µs";
(3) a combination of "C3*symbol length—25 us-TA" and "Cat2 16 µs"; and
(4) a combination of "C1*symbol length—25 us" and "Cat1 16 µs" or "Cat2 16 µs".

According to aspects of the disclosure, for fallback DL assignments (format 1_0) scheduling UL transmissions (e.g. PUCCH), the LBT type and the length of the CP extension can also be jointly encoded in the DL assignment. The supported combinations of the LBT type and the length of the CP extension are hardcoded in RAN1 specs. The DCI field can have 2 bits.

FIG. 3 shows a table 300 tabulating exemplary combinations for the fallback DL assignments according to an embodiment of the disclosure.

By performing the channel access procedure, the UE 110 can determine whether the accessed channel is idle or not. If the accessed channel is idle, the channel access procedure is successful and the UE 110 can occupy the accessed channel for the UL transmissions. Otherwise, the channel access procedure is failed and the UE 110 cannot occupy the accessed channel.

In 5G unlicensed spectrums (NR-U), an unlicensed band can be configured with an operating bandwidth larger than 20 MHz. If absence of Wi-Fi cannot be guaranteed (e.g. by regulation) in the unlicensed band where NR-U is operating, the NR-U operating bandwidth is an integer multiple of 20 MHz, and the channel access procedure can be performed in unit of 20 MHz.

FIG. 4 shows an exemplary channel access procedure 400 operating on an unlicensed band 410 according to an embodiment of the disclosure. The unlicensed band 410 is configured with an operating bandwidth of 80 MHz, and the channel access procedure 400 is performed per 20 MHz from sub-band 420 to sub-band 423 within the unlicensed band 410. The UE 110 or the BS 120 can initiate a channel occupancy that occupies the sub-band(s) whose channel access procedure is successful in a duration. For example, the UE 110 or the BS 120 can initiate a channel occupancy that occupies the sub-bands 420 and/or 422 whose channel access procedures are successful, but cannot occupy the sub-bands 421 or 423 whose channel access procedure are failed.

Figure 5:
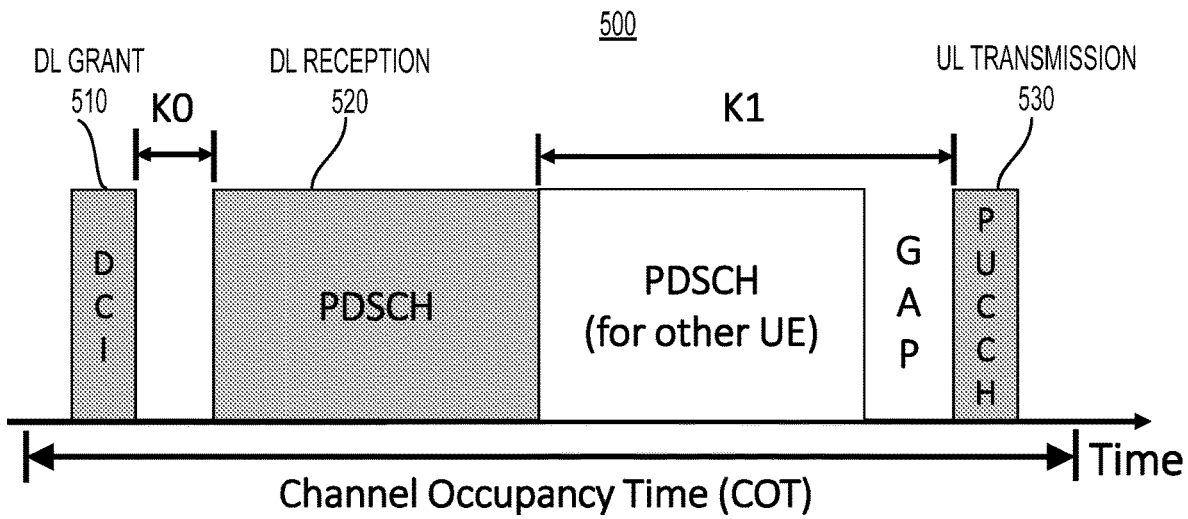
FIG. 5 shows an exemplary timing diagram of uplink/downlink transmission according to an embodiment of the disclosure.

FIG. 5 shows an exemplary timing diagram 500 of uplink/downlink transmission according to an embodiment of the disclosure. In the timing diagram 500, a DL grant 510 including a DCI scheduling a DL reception 520 (e.g., PDSCH) and an UL transmission 530 (e.g., PUCCH). In addition, the DL grant 510 can indicate a first timing offset K0 and a second timing offset K1. The first timing offset K0 indicates a timing offset between the DL grant 510 and the DL reception 520. The second timing offset K1 indicates a timing offset between the DL reception 520 and the UL transmission 530. It is noted that PDSCH(s) for other UE(s) may be located between the DL reception 520 and the UL transmission 530.

In some embodiments, the UL transmission 530 can include hybrid automatic repeat request-acknowledge (HARQ-ACK) information for the DL reception 520.

Since the UL transmission 530 operates on the unlicensed band, a channel access procedure may be performed on the unlicensed band. When the UL transmission 530 is outside of a channel occupancy that is indicated by the BS 120, the Type 1 channel access procedure with highest priority can be used. When the UL transmission 530 is inside of the COT, the different Type 2 channel access procedures can be used.

In some embodiments, the UE 110 can determine whether a Cat. 4 LBT can be switched to a Cat. 2 LBT for an UL transmission if the UL transmission is scheduled within a BS (e.g., gNB) initiated channel occupancy, based on the indicated remaining channel occupancy duration and indicated locations of the occupied sub-bands. For example, if the UE 110 determines a duration and a location of a remaining channel occupancy initiated by the BS 120 from a DCI with format 2_0, the UE 110 may switch from Type 1 channel access procedure to Type 2A channel access procedure for its corresponding UL transmissions scheduled within the remaining channel occupancy.

In some embodiments, the UE 110 receives a first DCI (e.g., $1^{st}$ DCI 140 in FIG. 1) from the BS 120. The first DCI can be a group common DCI that indicates channel occupancy information in time and frequency domains for a channel occupancy indicated by the BS 120. Then the UE 110 receives a second DCI (e.g., $2^{nd}$ DCI 150 in FIG. 1 or the DCI 510 in FIG. 5) scheduling a DL data transmission (e.g., the DL reception 520) and an UL transmission (e.g., the PUCCH transmission 530). The UL transmission is scheduled for a UCI report (e.g., the UCI report 130 in FIG. 1). The UCI report can include at least HARQ-ACK information for the DL data transmission. A timing slot offset between the DL data transmission and the UL transmission can be indicated in a field included in the second DCI.

In addition, the second DCI can indicate a first type of channel access procedure for the UL transmission. In one example, the second DCI includes a field to indicate at least the first type of channel access procedure for the UL transmission.

The UE 110 can determine a second type of channel access procedure based on the first type of channel access procedure and the channel occupancy information in time and frequency domains. In one example, if the UL transmission is scheduled within a channel occupancy initiated by the BS 120, and the first type of channel access procedure is indicated as a certain type (e.g., Type 1), the second type of channel access procedure can be determined to be different from the first type of channel access procedure. For example, the second type of channel access procedure can be determined to be Type 2A. Otherwise, the second type of channel access procedure is determined to be the same as the first type of channel access procedure indicated in the second DCI.

Figure 6:
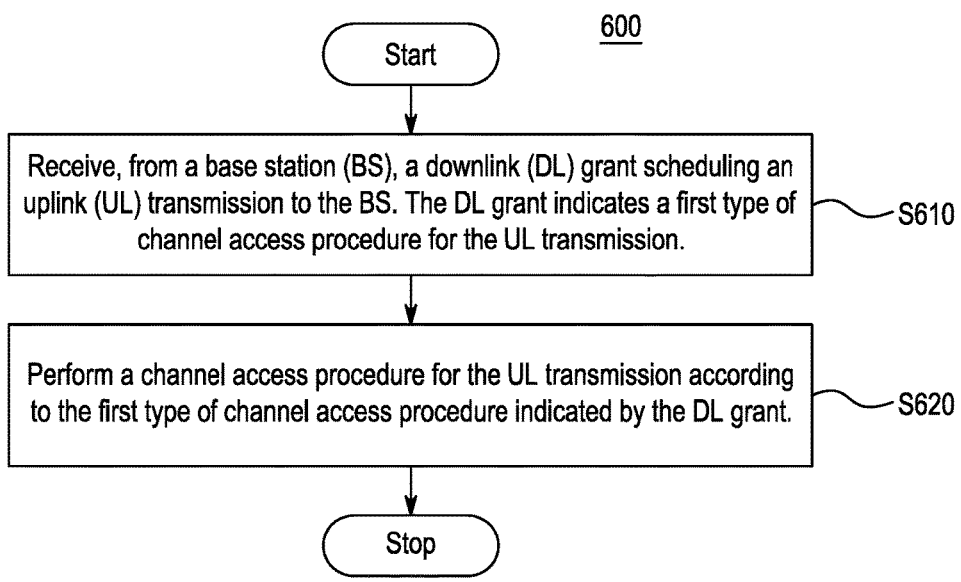
FIG. 6 shows a flowchart outlining an exemplary process according to an embodiment of the disclosure.

FIG. 6 shows a flowchart outlining an exemplary process 600 according to an embodiment of the disclosure. In various embodiments, the process 600 is executed by processing circuitry, such as the processing circuitry in the UE 110. In some embodiments, the process 600 is implemented in software instructions, thus when the processing circuitry executes the software instructions, the processing circuitry performs the process 600.

The process 600 may generally start at step S610, where the process 600 receives, from a base station (BS), a downlink (DL) grant scheduling an uplink (UL) transmission to the BS. The DL grant indicates a first type of channel access procedure for the UL transmission. Then the process 600 proceeds to step S620.

At step S620, the process 600 performs a channel access procedure for the UL transmission according to the first type of channel access procedure indicated by the DL grant. Then the process 600 terminates.

In some embodiments, the channel occupancy information of the BS is carried in downlink control information (DCI) and the UL transmission is a physical downlink control channel (PUCCH) transmission.

In some embodiments, the DL grant schedules a DL reception and indicates a timing offset between the DL reception and the UL transmission. The UL transmission can include hybrid automatic repeat request-acknowledge (HARQ-ACK) information for the DL reception.

In some embodiments, the channel occupancy information of the BS indicates a duration in time domain and a location in frequency domain for a channel occupancy that is initiated by the BS.

According to aspects of the disclosure, when the channel occupancy information of the BS is received, the process 600 determines whether the UL transmission is scheduled within the duration in time domain and the location in frequency domain for the channel occupancy that is initiated by the BS. When the UL transmission is determined to be scheduled within the duration in time domain and the location in frequency domain for the channel occupancy that is initiated by the BS, the process 600 performs a second type of channel access procedure.

In an embodiment, the second type of channel access procedure is based on the first type of the channel access procedure and the channel occupancy information in time domain.

In an embodiment, the second type of channel access procedure is based on the first type of the channel access procedure and the channel occupancy information in frequency domain.

In an embodiment, the second type of channel access procedure is based on the first type of the channel access procedure and the channel occupancy information in time and frequency domains.

Figure 7:
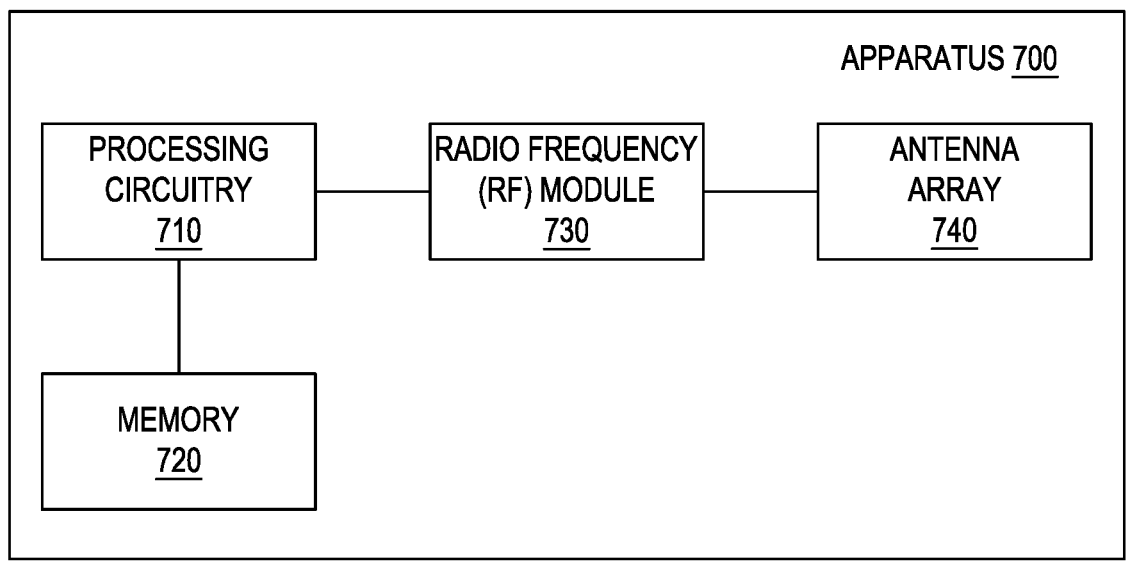
FIG. 7 shows an exemplary apparatus according to embodiments of the disclosure.

FIG. 7 shows an exemplary apparatus 700 according to embodiments of the disclosure. The apparatus 700 can be configured to perform various functions in accordance with one or more embodiments or examples described herein. Thus, the apparatus 700 can provide means for implementation of techniques, processes, functions, components, systems described herein. For example, the apparatus 700 can be used to implement functions of the 110 in various embodiments and examples described herein. The apparatus 700 can include a general purpose processor or specially designed circuits to implement various functions, components, or processes described herein in various embodiments. The apparatus 700 can include processing circuitry 710, a memory 720, a radio frequency (RF) module 730, and an antenna array 740.

In various examples, the processing circuitry 710 can include circuitry configured to perform the functions and processes described herein in combination with software or without software. In various examples, the processing circuitry 710 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 710 can be a central processing unit (CPU) configured to execute program instructions to perform various functions and processes described herein. Accordingly, the memory 720 can be configured to store program instructions. The processing circuitry 710, when executing the program instructions, can perform the functions and processes. The memory 720 can further store other programs or data, such as operating systems, application programs, and the like. The memory 720 can include a read only memory (ROM), a random access memory (RAM), a flash memory, a solid state memory, a hard disk drive, an optical disk drive, and the like.

The RF module 730 receives a processed data signal from the processing circuitry 710 and converts the data signal to a wireless signal that is then transmitted via the antenna array 740, or vice versa. The RF module 730 can include a digital to analog convertor (DAC), an analog to digital converter (ADC), a frequency up convertor, a frequency down converter, filters and amplifiers for reception and transmission operations. The RF module 730 can include multi-antenna circuitry for beamforming operations. For example, the multi-antenna circuitry can include an uplink spatial filter circuit, and a downlink spatial filter circuit for shifting analog signal phases or scaling analog signal amplitudes.

The apparatus 700 can optionally include other components, such as input and output devices, additional or signal processing circuitry, and the like. Accordingly, the apparatus 700 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of wireless communication at a user equipment (UE), the method comprising:
   receiving, from a base station (BS), channel occupancy information indicating a duration in a time domain and a location in a frequency domain for a channel occupancy that is initiated by the BS;
   when an uplink (UL) transmission is scheduled within the duration in the time domain and the location in the frequency domain for the channel occupancy that is initiated by the BS,
      performing a first type of channel access procedure for the UL transmission; and
   when the UL transmission is not scheduled within the duration in the time domain and the location in the frequency domain for the channel occupancy that is initiated by the BS,
      performing a second type of channel access procedure for the UL transmission.

2. The method of claim 1, wherein
   the second type of channel access procedure is indicated in a downlink (DL) grant scheduling the UL transmission.

3. The method of claim 1, further comprising:
   determining whether the UL transmission is scheduled within the duration in the time domain and the location in the frequency domain for the channel occupancy that is initiated by the BS.

4. The method of claim 1, wherein the first type of channel access procedure and the second type of channel access procedure are the same.

5. The method of claim 2, wherein the DL grant schedules a DL reception and indicates a timing offset between the DL reception and the UL transmission.

6. The method of claim 5, wherein the UL transmission includes hybrid automatic repeat request-acknowledge (HARQ-ACK) information for the DL reception.

7. The method of claim 1, wherein the channel occupancy information is carried by downlink control information (DCI).

8. An apparatus, comprising processing circuitry configured to:
   receive, from a base station (BS), channel occupancy information indicating a duration in a time domain and a location in a frequency domain for a channel occupancy that is initiated by the BS;
   when an uplink (UL) transmission is scheduled within the duration in the time domain and the location in the frequency domain for the channel occupancy that is initiated by the BS,
      perform a first type of channel access procedure for the UL transmission; and
   when the UL transmission is not scheduled within the duration in the time domain and the location in the frequency domain for the channel occupancy that is initiated by the BS,
      perform a second type of channel access procedure for the UL transmission.

9. The apparatus of the claim 8, wherein
   the second type of channel access procedure is indicated in a downlink (DL) grant scheduling the UL transmission.

10. The apparatus of the claim 8, wherein the processing circuitry is further configured to:
    determine whether the UL transmission is scheduled within the duration in the time domain and the location in the frequency domain for the channel occupancy that is initiated by the BS.

11. The apparatus of the claim 8, wherein the first type of channel access procedure and the second type of channel access procedure are the same.

12. The apparatus of the claim 9, wherein the DL grant schedules a DL reception and indicates a timing offset between the DL reception and the UL transmission.

13. The apparatus of the claim 12, wherein the UL transmission includes hybrid automatic repeat request-acknowledge (HARQ-ACK) information for the DL reception.

14. The apparatus of the claim 8, wherein the channel occupancy information is carried by downlink control information (DCI).

15. A non-transitory computer-readable storage medium storing a program executable by at least one processor to perform:
    receiving, from a base station (BS), channel occupancy information indicating a duration in a time domain and a location in a frequency domain for a channel occupancy that is initiated by the BS;
    when an uplink (UL) transmission is scheduled within the duration in the time domain and the location in the frequency domain for the channel occupancy that is initiated by the BS,
       performing a first type of channel access procedure for the UL transmission; and
    when the UL transmission is not scheduled within the duration in the time domain and the location in the frequency domain for the channel occupancy that is initiated by the BS,
       performing a second type of channel access procedure for the UL transmission.

16. The non-transitory computer-readable storage medium of claim 15, wherein
    the second type of channel access procedure is indicated in a downlink (DL) grant scheduling the UL transmission.

17. The non-transitory computer-readable storage medium of claim 15, wherein the program executable by at least one processor is further to perform:

determining whether the UL transmission is scheduled within the duration in the time domain and the location in the frequency domain for the channel occupancy that is initiated by the BS.

18. The non-transitory computer-readable storage medium of claim 15, wherein the first type of channel access procedure and the second type of channel access procedure are the same.

19. The non-transitory computer-readable storage medium of claim 16, wherein the DL grant schedules a DL reception and indicates a timing offset between the DL reception and the UL transmission.

20. The non-transitory computer-readable storage medium of claim 19, wherein the UL transmission includes hybrid automatic repeat request-acknowledge (HARQ-ACK) information for the DL reception.

* * * * *